Sept. 19, 1961     H. KNAPP ET AL     3,000,368

FUEL INJECTION APPARATUS FOR INTERNAL COMBUSTION ENGINES

Filed April 14, 1960

INVENTORS
Heinrich Knapp
Leo Steinke
BY Michael S. Striker
Attorney

United States Patent Office  3,000,368
Patented Sept. 19, 1961

3,000,368
FUEL INJECTION APPARATUS FOR INTERNAL COMBUSTION ENGINES
Heinrich Knapp and Leo Steinke, Stuttgart, Germany, assignors to Robert Bosch G.m.b.H., Stuttgart, Germany
Filed Apr. 14, 1960, Ser. No. 22,255
Claims priority, application Germany Apr. 15, 1959
8 Claims. (Cl. 123—119)

The present invention concerns an electrically operated fuel injection apparatus for internal combustion engines, having at least one electromagnetically operable injection nozzle device.

The smallest amounts of fuel to be injected by injection devices of the type set forth are only a fraction, e.g. $1/7$ to $1/10$ of those amounts of fuel which are to be injected when the engine runs at full load. Since the electromagnet forming part of the injection nozzle device comprises a solenoid coil and magnetizable members of electrically conductive material, every interruption of the current energizing the solenoid for the purpose of temporarily opening the nozzle generates by induction eddy currents in the magnetizable members which prevent the movable valve member of the nozzle device from returning immediately to its normal closing position when the energizing current is discontinued. As a matter of fact, the eddy currents maintain a residual magnetic field which decays only slowly so that in conventional devices of this type the valve pin of the nozzle device returns to closing position only after a delay period of about 1 msec. In internal combustion engines operating at high speeds even for the injection of the comparatively large amounts of fuel required for the full load run only a very short period of time is available for the injection procedure, while at the comparatively low idling speed calling only for injection of the above mentioned small fraction of the full load fuel requirement the period of time during which the nozzle valve is to be kept in open position must be reduced considerably i.e., to about 1 msec. so that the magnitude of this operative period of the valve is in the same order as the above mentioned ordinary delay in the return of the valve pin to closing position. It is evident that under such conditions a sufficiently accurate control of the injection fuel amount at low rotary speeds of the engine is practically impossible.

It is therefore a main object of this invention to provide for a fuel injection apparatus in which the above mentioned delay period affecting the return of the nozzle valve to closing position is substantially reduced, e.g. to about one-half of the amount obtainable by conventional means, in order to be able to control with sufficient accuracy the amount obtainable of fuel injected during idling periods of internal combustion engines operating ordinarily at comparatively high rotary speeds.

It is a further object of the invention to provide for an apparatus, and particularly for electrical control means, which is comparatively simple and entirely reliable.

With above objects in view, an electrically operated fuel injection apparatus for internal combustion engines, having at least one electromagnetically operable injection nozzle device, comprises, according to the invention, in combination, electromagnetic means in said nozzle device energizable for moving said nozzle device between one and the other of said conditions; electrical energy means for furnishing electric pulses for energizing said electromagnetic means for spaced pulse periods so as to move electromagnetically said nozzle device from one to the other one of said conditions during said pulse periods, with a residual electromagnetic effect of said electromagnetic means appearing therein after the termination of each pulse period and tending to create a delay of the return of said nozzle means to said one condition thereof; and electrical means for reducing said delay by counteracting said residual electromagnetic effect.

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawing in which:

Figure 1:
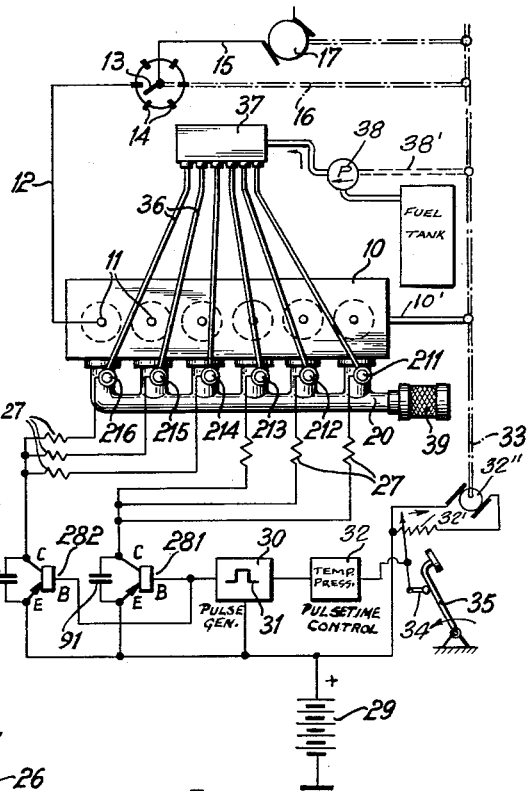
FIG. 1 is a schematic diagram illustrating a fuel injection installation together with the circuit components according to the invention.

The fuel injection apparatus generally illustrated by FIG. 1 may be applied, by way of example, to a six-cylinder engine 10 forming part of an automotive vehicle. It may be assumed that the engine 10 operates with externally applied ignition and has six spark plugs 11. Each of these plugs is connected via a cable 12 (one of which is only shown) with a distributor having a rotating electrode 13 and six stationary contacts 14, each of the cables 12 being connected with one of the contacts 14. A cable 15 serves to connect the rotating electrode 13 with a high voltage generator 17 which furnishes for every stroke of the engine an impulse generating a spark at the respective spark plug. The rotating electrode 13 is driven by a shaft 16 symbolized by dash-dot line which, in turn, is operated by the cam shaft 10' of the engine. Each cylinder of the engine 10 has an inlet valve, not shown, associated with one of the injection nozzle devices 211–216 of the type illustrated by FIG. 2, the nozzle devices being mounted in the corresponding branches of a common air inlet tube 20 equipped with an air filter 39.

Figure 2:
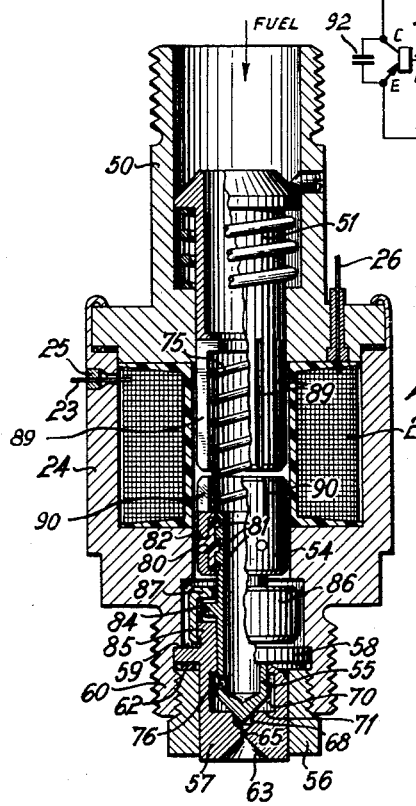
FIG. 2 illustrates at a large scale, one of the injection nozzle devices appearing in FIG. 1, in cross-sectional elevation.

Each of the nozzle devices, as shown by FIG. 2, comprises a solenoid coil 22 the one end 23 whereof is grounded by being conductively connected by solder 25 with the magnet housing 24 made of soft magnetizable iron. The other end 26 of the coil 22 extends through an insulating bushing to the outside of the housing 24 and is connected via a resistor 27 to a control transistor. In this example one transistor 281, 282, respectively, is associated and connected with three nozzle devices i.e., the respective solenoid coils thereof. Each of the transistors 281 and 282 is connected with its emitter-collector circuit between the positive terminal of a storage battery 29 and the respective group of resistors 27 and solenoid coils 22. The base electrodes of the transistors 281 and 282 are connected with an impulse generator 30 of conventional type. This generator furnishes electrical pulses in rapid succession, the pulses having substantially the shape indicated at 31. The transistors 281 and 282 are normally non-conductive, but upon application of a pulse from the generator 30 the transistors are rendered conductive for a brief period determined by the duration of the individual pulse. Hereby all of the six solenoid coils 22 of the nozzle devices 211–216 are simultaneously energized by current supplied by the battery 29 across the respective resistors 27. Upon energization of the coils 22 the valve member of the respective nozzle device is moved to open position so as to cause injection of fuel into the associated inlet valve. Evidently the amount of fuel injected is the larger the longer is the duration of the pulses 31 furnished by the generator 30. For varying the duration of these pulses and thereby the amount of injected fuel in accordance with the operational condition of the engine an electronic pulse time control device 32 of conventional type is provided as shown in FIG. 1. This device 32 comprises conventional electrical components operatively connected via mechanical means 33, 34 with the cam shaft of the engine 10 and with the gas pedal 35 thereof. These components may comprise a tachometer type generator 32" coupled by transmission means 33 with the crank shaft 10' for delivering in a circuit containing a potentiometer 32' a voltage increasing with increasing engine speed; the movable tap of the potentiometer is controlled by the movement of the gas pedal 35 via link 34 so that a variable portion of the generator voltage is tapped and introduced into the pulse generator 30 via the control device 32 which comprises control elements responsive to the barometric air pressure, the temperature of the cooling fluid and to the temperature of the ambient air all of which contribute to determining and controlling the duration of the control pulses 31.

Each of the nozzle injection devices 21₁–21₆ is connected by a respective tubular member 36 with a fuel tank 37 in which the fuel is maintained at substantially uniform pressure by means of a fuel supply pump 38 which is also operatively coupled with the crank shaft of the engine by transmission means 38' and 33 for being driven thereby. Whenever the valve members in the individual injection nozzle device is moved to open condition fuel is injected into the inlet valves of the engine and is mixed there with the air furnished through the air filter 39 and the manifold tube 20. FIG. 2 will serve to illustrate in greater detail the construction of the individual injection nozzle devices 21₁–21₆. A flanged tubular extension 50 is mounted on the valve or nozzle device housing 24 and a tubular core member 51 is coaxially mounted in the member 50, adjustable in longitudinal direction by the interaction of a lateral set screw and a tapered surface portion at the outer end of the member 51. The lower end of the core member 51 projects into the center space of the coil 22. The members 50 and 51 are made of magnetizable material. A movable armature member 54 is mounted coaxially with the housing 24 and with the core member 51 and projects likewise into the center space of the coil 22 so that normally its upper end, as seen in FIG. 2, is somewhat spaced from the lower end of the core member 51. The armature member 54 is axially movable within the housing 24. Suspended from the armature member 54 is a hollow valve pin member 55 having a conical forward end cooperating with a nozzle body 57 held on the lower end of the housing 24 by means of a nipple 56. The nipple 56 when screwed in the interior threaded portion 60 of the housing 24 presses the flange 58 of the nozzle member 57 against a shoulder 59 provided in the housing 24, an elastic sealing ring 22 being interposed. The nozzle body 57 has a front face slightly projecting beyond the end of the nipple 56 and provided with a conical opening 63 communicating through the nozzle duct 65, coaxial with the valve pin 55 with a bore or recess 68 of larger diameter which, in turn, communicates with an annular space 70 surrounding the forward end of the valve pin 55. The nozzle duct 65 is kept very short so that only small amounts of fuel can possibly remain therein after the valve pin has assumed its closing position relative to the cooperating rearward edge of the bore 68 in the bottom surface 71 of the annular zone 70, as shown.

As soon as any one of the transistors 28₁—28₂ directs to the respectively associated coils 22 a magnetizing current of sufficient strength for creating an electromagnetic field pulling the armature 54 together with the attached valve pin 55 toward the stationary core member 51, against the action of a return spring 75, the lower end of the valve pin 55 is lifted from its seat formed by the edge of the bore 68, so that the fuel introduced under pressure into the upper open end of the member 50 and through the cylindrical member 51 and 54 and from there through a transversal opening 76 into the annular chamber 70, is ejected through the nozzle duct 65. Fundamentally, the individual valve pins 55 are held in the opening position as long as the individual control impulse 31 lasts. As soon as thereafter the control impulse 31 having a very steep trailing flank terminates the conductive condition of the transistors so that the latter return to non-conductive condition, the energizing current through the magnetizing windings of the coil 22 is also terminated so that the previously existing magnetic field is expected to disappear so that the armature 54 together with the attached valve pin 55 in all the nozzle devices are returned through the action of the return spring 75 to closing position. In order to prevent a spurious, undesirable subsequent fuel ejection an intermediate layer 80 of elastic material is provided between the lower end of the armature 54 and the upper end of the valve pin 55 where the latter projects into the armature 54. This elastic layer is preferably made of resilient, thermoplastic synthetic material of the polyamide group, e.g. the material known by the trade name "nylon," which is cast or otherwise forced into the space provided therefor between the members 55 and 54. In this manner the layer 80 is capable of completely filling the gap between the just-mentioned parts and is thus capable of elastically absorbing a great part of the impact forces appearing when the valve pin 55 hits the cooperating valve seat in the nozzle member 57. In order to prevent longitudinal shift of the valve pin 55 relative to the armature member 54, three annular grooves 81 are provided in the pin 55, while the armature member 54 is provided with a plurality of transverse holes 82 so that the elastic material will anchor itself both in the grooves and holes.

In order to further dampen hard impact of the valve pin 55 at the moment of closing, the valve pin 55 is provided with an annular flange 84 which is surrounded by an annular nut 86 screwed onto the upper thread 85 of the nozzle body 57. The nut 86 has a shoulder 87 at its end facing the armature 54 whereby a restricted space for fuel accommodated during operation within the inner space of the nut 86 is established. Consequently this amount of liquid will act as a hydraulic dampening fluid. At the same time the shoulder 87 will constitute a limiting stop predetermining the maximum opening movement of the valve pin 55. In this manner it can be prevented that the armature 54 could hit with its free upper end the opposite face of the stationary core member 51 and stick to it. Thus, if the core member 51 is properly positioned, always a minute gap will remain between the members 54 and 51 even when the member 54 is in completely raised position. Both the core member 51 and the armature member 54 are provided with radially and axially extending slots 89 and 90, respectively, starting from the respectively opposite ends thereof. These slots serve to prevent the development of circular currents in these members when the magnetic field is created or caused to disappear.

It has been found that nevertheless the appearance and disappearance of the magnetic field created by the energization of the coil 22 creates eddy currents in the magnetizable parts of the injection device, for instance in the housing 24, which have the same electromagnetic effect on the armature 54 as the previous energization of the coil 22. Therefore the appearance of these eddy currents after the termination of the individual pulses causes a substantial delay of the return of the armature 54 and thus of the valve pin 55 to closed position.

In order to reduce this delay the invention provides an oscillatory circuit constituted by at least one of the magnet coils 22 and a capacitor connected either in parallel with that particular coil 22, or several of them, or connected in parallel with the respective transistor. In the example illustrated by FIG. 1 a capacitor 91 is connected in parallel with the emitter-collector circuit of the transistor 281, and similarly a capacitor 92 is connected in parallel with the emitter-collector circuit of the transistor 282. The capacitance of these capacitors in relation to the inductance of the respective magnet coil 22, or of the three magnet coils 22 associated with the respective transistor, has to be such that the resonance frequency of the respective oscillatory circuit is capable of counteracting the effect of the eddy currents mentioned above. Specifically, this resonance frequency of the oscillatory circuit should be lower than, or at the utmost equal to, the limit frequency of the eddy currents appearing at the termination of a control impulse in the magnetizable conductive portions of the injection nozzle devices.

Figure 3:
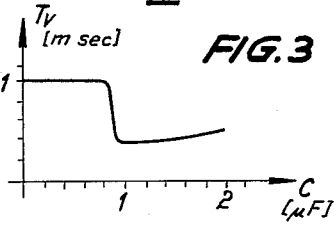
FIG. 3 is a diagram illustrating the relation between the delay time periods and the capacitance of capacitors used in the circuit of FIG. 1.

The diagram of FIG. 3 will serve to illustrate in what manner the capacitance C of the capacitor 91 or 92 can be determined. The diagram FIG. 3 is derived from experiments made with a circuit in which only a single magnet coil 22 of one injection nozzle device is operated by one of the transistors 281 or 282. As can be seen from the diagram the time delay $T_v$ has a constant value of about 1 msec in all cases where the capacitance C of a capacitor connected in parallel with the emitter-collector circuit of the transistor is smaller than .8 $\mu f$. The inductance of the magnetizing coil 22 used in these experiments varied between 35 mh. (with armature 54 attracted), and 20 mh. (with armature 54 released). Evidently, the first mentioned inductance value is the one which controls the limit frequency. The above-mentioned observation is due to the fact that the resonance frequency of the oscillatory circuit having so small a capacitance is higher than the limit frequency of the eddy currents in the iron parts of the injection device. However, if the capacitance C of the capacitor is increased from .8 to 1 $\mu f$ then the delay time $T_v$ drops at a capacitance of .9 $\mu f$ to about one-half of the previous value, namely to about .45 msec. If the capacitance of the capacitor were further changed to be substantially larger than 1 $\mu f$ then the time delay slightly increases with increased capacitances.

On the basis of the experiments made with a single magnetizing coil and illustrated by FIG. 3 the capacitances for the capacitors 91 and 92 associated jointly with three magnet coils 22 according to the example of FIG. 1 have been chosen to be 2.7 $\mu f$ each because the total inductance $L_g$ of the parallel connected three injection devices obviously amounts to one-third of the inductance $L_v$ of the individual injection device.

Figure 4:
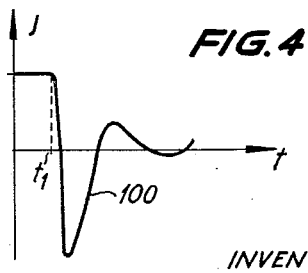
FIG. 4 is a diagram illustrating the variations of the current flow in portions of the circuit illustrated by FIG. 1.

The diagram of FIG. 4 will serve to illustrate the variation in time of a current J when the emitter-collector circuit of the transistors as shown in FIG. 1 is shunted by capacitors, the capacitance C having optimum value determined by the above-mentioned experiments. When at the moment $t_1$ the rectangular impulse 31 controlling the transistors 281 and 282 drops off with an infinitely steep trailing flank a transient current J starts to flow which rapidly drops to the value 0 and then flows in opposite direction through the windings of the magnet coil 22 as is indicated in FIG. 4 by the negative half-wave 100. This transient current which charges the condensers 91, 92, respectively, generates through the coil 22 a counteracting magnetic field opposing the residual field maintained by the above mentioned eddy currents. Consequently the effect of the eddy currents is rapidly compensated so that the valve pin 55 returns into its closing position substantially earlier than would be the case if the capacitors 91 and 92 were not provided.

It will be understood that each of the elements described above or two or more together, may also find a useful application in other types of electrically operated fuel injection apparatus differing from the types described above.

While the invention has been illustrated and described as embodied in electrically operated fuel injection apparatus for internal combustion engines, having at least one electromagnetically operable injection nozzle device, it is not intended to be limited to the details shown, since various modifications and structural changes may be made without departing in any way from the spirit of the present invention.

Without further analysis the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed and desired to be secured by Letters Patent is:

1. In an electrically operated fuel injection apparatus for internal combustion engines, having at least one electro-magnetically operable injection nozzle device movable between open and closed conditions, in combination, electromagnetic means in said nozzle device energizable for moving said nozzle device between one and the other of said conditions; electrical energy means for furnishing electric pulses for energizing said electromagnetic means for spaced pulse periods so as to move electromagnetically said nozzle device from one to the other one of said conditions during said pulse periods, with a residual electromagnetic effect of said electromagnetic means appearing therein after the termination of each pulse period and tending to create a delay of the return of said nozzle means to said one condition thereof; and electrical means for reducing said delay by counteracting said residual electromagnetic effect.

2. In an electrically operated fuel injection apparatus for internal combustion engines, having at least one electromagnetically operable injection nozzle device, in combination, solenoid coil means of predetermined inductance, and magnetizable members arranged in said nozzle device for moving said nozzle device to open condition upon energization of said coil means; a source of electric energy for energizing said coil means; electric pulse generator means for furnishing electric control pulses of variable duration and frequency depending upon operational conditions of the engine; circuit means connecting said source of energy with said coil means and comprising pulse-operable switch means having a control element connected with said pulse generator means and being responsive to a pulse applied to said control element so as to permit passage of energy from said source to said coil means only during the duration of said pulse, and capacitor means connected in parallel with a portion of the circuit constituted by said circuit means and said coil means so as to form an oscillatory circuit, the capacitance of said capacitor means in relation to said inductance of said coil means being such that the resonance frequency generated in said oscillatory circuit upon termination of said pulse counteracts a post-pulse residual magnetic effect of said coil means.

3. In an electrically operated fuel injection apparatus for internal combustion engines, having at least one electromagnetically operable injection nozzle device, in combination, solenoid coil means of predetermined inductance, and magnetizable members arranged in said nozzle device for moving said nozzle device to open condition upon energization of said coil means; a source of electric energy for energizing said coil means; electric pulse generator means for furnishing electric control pulses of variable duration and frequency depending upon operational conditions of the engine; circuit means connecting said source of energy with said coil means and comprising pulse-operable transistor means, its emitter-collector circuit connected in series with said coil means and having its base connected with said pulse generator means and being responsive to a pulse applied to said base so as to permit passage of energy from said source to said coil means only during the duration of said pulse, and capacitor means connected in parallel with a portion of the circuit constituted by said circuit means and said coil means so as to form an oscillatory circuit, the capacitance of said capacitor means in relation to said inductance of said coil means being such that the resonance frequency generated in said oscillatory circuit upon termination of said pulse counteracts a post-pulse residual magnetic effect of said coil means.

4. In an electrically operated fuel injection apparatus for internal combustion engines, having at least one electromagnetically operable injection nozzle device, in combination, solenoid coil means of predetermined inductance, and magnetizable members arranged in said nozzle device for moving said nozzle device to open condition upon energization of said coil means; a source of electric energy for energizing said coil means; electric pulse generator means for furnishing electric control pulses of variable duration and frequency depending upon operational conditions of the engine; circuit means connecting said source of energy with said coil means and comprising pulse-operable transistor means, its emitter-collector circuit connected in series with said coil means and having its base connected with said pulse generator means and being responsive to a pulse applied to said base so as to permit passage of energy from said source to said coil means only during the duration of said pulse, and capacitor means connected in parallel with said emitter-collector circuit of said transistor means so as to form an oscillatory circuit with said coil means, the capacitance of said capacitor means in relation to said inductance of said coil means being such that the resonance frequency generated in said oscillatory circuit upon termination of said pulse counteracts a post-pulse residual magnetic effect of said coil means.

5. In an electrically operated fuel injection apparatus for internal combustion engines, having at least one electromagnetically operable injection nozzle device, in combination, solenoid coil means of predetermined inductance, and magnetizable members arranged in said nozzle device for moving said nozzle device to open condition upon energization of said coil means; a source of electric energy for energizing said coil means; electric pulse generator means for furnishing electric control pulses of variable duration and frequency depending upon operational conditions of the engine; circuit means connecting said source of energy with said coil means and comprising pulse-operable transistor means, its emitter-collector circuit connected in series with said coil means and having its base connected with said pulse generator means and being responsive to a pulse applied to said base so as to permit passage of energy from said source to said coil means only during the duration of said pulse, and capacitor means connected in parallel with said coil means so as to form an oscillatory circuit therewith, the capacitance of said capacitor means in relation to said inductance of said coil means being such that the resonance frequency generated in said oscillatory circuit upon termination of said pulse counteracts a post-pulse residual magnetic effect of said coil means.

6. In an electrically operated fuel injection apparatus for internal combustion engines, having at least one electromagnetically operable injection nozzle device, in combination, solenoid coil means of predetermined inductance, and magnetizable members arranged in said nozzle device for moving said nozzle device to open condition upon energization of said coil means; a source of electric energy for energizing said coil means; electric pulse generator means for furnishing electric control pulses of variable duration and frequency depending upon operational conditions of the engine; circuit means connecting said source of energy with said coil means and comprising pulse-operable switch means having a control element connected with said pulse generator means and being responsive to a pulse applied to said control element so as to permit passage of energy from said source to said coil means only during the duration of said pulse, and capacitor means connected in parallel with a portion of the circuit constituted by said circuit means and said coil means so as to form an oscillatory circuit, the capacitance of said capacitor means in relation to said inductance of said coil means being such that the resonance frequency generated in said oscillatory circuit upon termination of said pulse is within the range below and up to the frequency of eddy currents induced in said magnetizable members upon termination of the energization of said coil means, and thus counteracts a post-pulse residual magnetic effect of said coil means.

7. In an electrically operated fuel injection apparatus for internal combustion engines, having at least one electromagnetically operable injection nozzle device, in combination, solenoid coil means of predetermined inductance, and magnetizable members arranged in said nozzle device for moving said nozzle device to open condition upon energization of said coil means; a source of electric energy for energizing said coil means; electric pulse generator means for furnishing electric control pulses of variable duration and frequency depending upon operational conditions of the engine; circuit means connecting said source of energy with said coil means and comprising pulse-operable transistor means having its emitter-collector circuit connected in series with said coil means and having its base connected with said pulse generator means and being responsive to a pulse applied to said base so as to permit passage of energy from said source to said coil means only during the duration of said pulse, and capacitor means connected in parallel with said emitter-collector circuit of said transistor means so as to form an oscillatory circuit with said coil means, the capacitance of said capacitor means in relation to said inductance of said coil means being such that the resonance frequency generated in said oscillatory circuit upon termination of said pulse is within the range below and up to the frequency of eddy currents induced in said magnetizable members upon termination of the energization of said coil means, and thus counteracts a post-pulse residual magnetic effect of said coil means.

8. In an electrically operated fuel injection apparatus for internal combustion engines, having at least one electromagnetically operable injection nozzle device, in combination, solenoid coil means of predetermined inductance, and magnetizable members arranged in said nozzle device for moving said nozzle device to open condition upon energization of said coil means; a source of electric energy for energizing said coil means; electric pulse generator means for furnishing electric control pulses of variable duration and frequency depending upon operational conditions of the engine; circuit means connecting said source of energy with said coil means and comprising pulse-operable transistor means having its emitter-collector circuit connected in series with said coil means and having its base connected with said pulse generator means and being responsive to a pulse applied to said base so as to permit passage of energy from said source to said coil means only during the duration of said pulse, and capacitor means connected in parallel with said coil means so as to form an oscillatory circuit therewith, the capacitance of said capacitor means in relation to said inductance of said coil means being such that the resonance frequency generated in said oscillatory circuit upon termination of said pulse is within the range below and up to the frequency of eddy currents induced in said magnetizable members upon termination of the energization of said coil means, and thus counteracts a post-pulse residual magnetic effect of said coil means.

No references cited.